July 4, 1933.  L. O. CAMERON  1,917,093
AIR DEFLECTOR
Filed Sept. 19, 1932
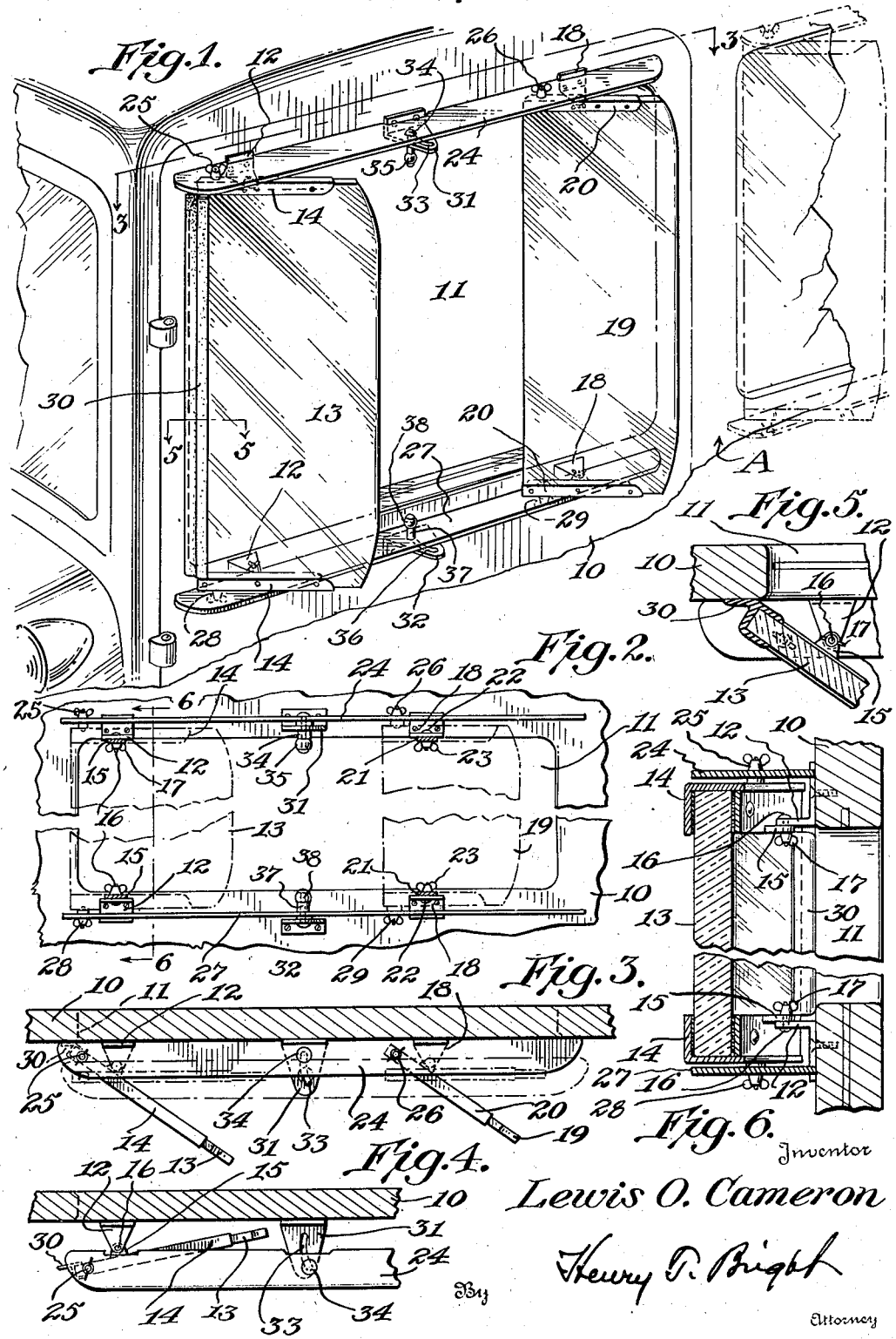
Inventor
Lewis O. Cameron
By Henry P. Bright
Attorney Patented July 4, 1933

1,917,093

UNITED STATES PATENT OFFICE

LEWIS O. CAMERON, OF WASHINGTON, DISTRICT OF COLUMBIA, ASSIGNOR TO LOUISE W. CAMERON, OF WASHINGTON, DISTRICT OF COLUMBIA

AIR DEFLECTOR

Application filed September 19, 1932. Serial No. 633,864.

My invention relates to air deflectors of the type employed to deflect air current away from the window openings of an automobile or airplane body so as to prevent entry of such current into the body, and thus protect the occupants from strong drafts and particularly the reactive back draft which constitutes the most discomforting condition incident to automobile travel as well as a danger to health.

It is the purpose of my present invention to provide an air deflector which, when applied, may be adjusted to a position to effectively prevent the entrance of air currents from any direction into the body through its related window opening and also to positions to deflect the air current into the body and to render the deflector inoperative or neutral.

My invention further contemplates the provision of a deflector of the type specified which, when adjusted to exclude air currents from the body, will render proper heating possible without sacrifice of ventilation.

My invention also contemplates the provision of an air deflector which can be readily and easily operated to any desired adjustment by an occupant within the car and which will be comparatively simple and durable in construction.

I will describe my invention in the best form known to me at present and as applied to a door window of an automobile body but it will be apparent that the same is susceptible to other applications and to also changes in form and proportions and desirable mechanical additions with the exercise of only ordinary mechanical skill and without departing from the spirit thereof.

In the drawing chosen to illustrate my invention the scope whereof is set forth in the appended claims.

Figure 1 is a perspective view of a fragment of an automobile body showing my invention operatively associated therewith and with the deflecting elements adjusted so as to deflect air currents away from its related window opening;

Figure 2, a side elevation of the deflector in the adjustment shown in Figure 1 and with the vertical deflecting elements shown in dot and dash lines to more clearly disclose remaining parts;

Figure 3, a section on the line 3—3 of Figure 1;

Figure 4, a view similar to Figure 3 showing a fragment of the deflector adjusted to deflect air currents into the car body;

Figure 5, a section on the line 5—5 of Figure 1, and

Figure 6, a section on the line 6—6 of Figure 2.

Referring to the drawing A indicates a sedan body of an automobile, 10 is the left front door thereof, and 11 the door window opening. Mounted on the door 10 above and below and relatively near the front end of the opening 11 are vertically alined brackets 12 and between these brackets I pivotally mount a front deflector plate 13, of glass. The pivotal connections of the plate 13 with the brackets 12 are each provided by a metal marginal clamp 14 receiving an edge of the plate 13 and having a lateral ear 15 overlying its related bracket 12, said ear being pivotally connected to the latter by means of a pivot bolt 16. A wing nut 17 on the bolt 16 is operable to regulate the frictional engagement between its related ear 15 and bracket 12.

Mounted on the door 10 above and below and between the rear end of the opening 11 and the brackets 12 are vertically alined brackets 18. Between these brackets I pivotally mount a glass rear deflector plate 19. The pivotal connections of the plate 19 with the brackets 18 is structurally identical with the pivotal connections of the plates 13 with the brackets 12 as heretofore described and each embodies a marginal clamp 20, ear 21 integral with the clamp, a pivot bolt 22 connecting the ear 21 with its related bracket 18, and a wing nut 23 on said pivot bolt.

A horizontal deflector plate 24 is pivotally connected to the upper marginal clamps 14 and 20 at 25 and 26 respectively while a horizontal deflector plate 27 is pivotally connected to the lower marginal clamps 14 and 20 at 28 and 29 respectively. The mounting of the deflectors 24 and 27 with respect to the pivotal axis of the deflectors 13 and 19 is such that when the latter deflectors are correctly positioned to deflect air current from the opening 11 as shown in Figures 1 and 3, the inner edges of the plates 24 and 27 will be in engagement with the outer face of the door 10 and in such position they serve to effectively block or baffle upward and downward air currents which would otherwise pass through the opening 11. It will be noted that the deflectors 24 and 27 by engaging the door 10 serve to positively determine an angular adjustment of the vertical deflectors. I have discovered that a thirty-five degree adjustment of the vertical deflectors from their neutral position shown in dot and dash lines in Figure 3 is most efficient and such adjustment is shown in full lines in Figures 1 and 3. It will be noted that when the deflector 13 is in the operative position shown in Figures 1 and 5 there would ordinarily occur a space between the body A and the vertical edge of the deflector. To close this space against passage of air current therethrough I mount on said vertical edge of the deflector a rubber flap 30 which extends across said space and engages the body A as clearly shown in Figure 5.

To provide for the adjustment of the deflectors by an occupant of the body A I mount on said body above and below the window opening 11 respectively and between the deflectors 13 and 19 brackets 31 and 32, said brackets extending beneath the horizontal deflectors 24 and 27 respectively as clearly shown in Figure 1. In the bracket 31 I provide a slot 33 having a curvature corresponding to the movement of the deflector 24 during adjustment of the latter. Fixed to the deflector 24 is a pin 34 which extends through the slot 33 and carries at its free end a rotatable gripping head 35. Likewise, I provide in the bracket 32 a slot 36 having a curvature corresponding to the movement of the deflector 27 during adjustment of the latter. Fixed on the deflector 27 is a pin 37 one end of which extends downwardly through the slot 36, while the other end thereof is positioned above the deflector 27 and has mounted thereon a rotatable gripping head 38. It will be apparent that an occupant within the body A can simultaneously grasp the gripping heads 35 and 38 and directly move the horizontal deflectors 24 and 27 as desired, which movement of the horizontal deflectors will of course effect angular adjustment of the vertical deflectors 13 and 19. The pin and slot connections previously described serve to control and guide the movements of the horizontal deflectors and materially assist in their adjustment by an occupant of the body A. The spacement of the deflectors 13 and 19 with respect to each other and with respect to the opening 11 is such that air current deflected by the deflector 13 will engage and be again deflected outwardly before it can pass through the opening 11.

It will be noted that the angular range of adjustment of deflectors 13 and 19 is sufficient to allow said deflectors to be positioned as shown in Figure 4 so as to deflect air through the opening 11.

I claim:

1. In a structure of the class described, the combination with a passenger transporting enclosure having a window opening, of a pair of spaced vertical air current deflectors for the opening pivotally mounted on the enclosure exteriorly of the latter, and upper and lower horizontal air current deflectors for the window opening, each pivotally connected to the vertical deflectors and movable into and out of engagement with the enclosure as the vertical deflectors are moved to their operative and inoperative positions with respect to the deflection of air current against entry through the window opening.

2. In a structure of the class described, the combination with a passenger transporting enclosure having a window opening, of a pair of spaced vertical air current deflectors for the opening pivotally mounted on the enclosure exteriorly of the latter, and upper and lower horizontal air current deflectors for the window opening, each pivotally connected to the vertical deflectors and bearing against the enclosure when the vertical deflectors are disposed in their operative positions with respect to the deflection of air current against entry through said window opening.

3. In a structure of the class described, the combination with a passenger transporting enclosure having a window opening, of a pair of spaced vertical air current deflectors for the window opening, pivotally mounted on the enclosure exteriorly of the latter, upper and lower horizontal deflectors each pivotally connected to the vertical deflectors and movable into and out of engagement with the enclosure as the vertical deflectors are moved to their operative and inoperative positions with respect to the deflection of air current against entry through the window opening, and means operable from the interior of the enclosure to move the horizontal deflectors and thereby pivot the vertical deflectors.

4. In a structure of the class described, the combination with a passenger transporting enclosure having a window opening, of a pair of spaced vertical air current deflectors for the opening pivotally mounted on the enclosure exteriorly of the latter, upper and lower horizontal air current deflectors for the window opening, each pivotally connected to the vertical deflectors and movable into and out of engagement with the enclosure as the vertical deflectors are moved to their operative and inoperative positions with respect to air current against entry through the window opening, two brackets mounted on the body one above and the other below the window opening, and a pin and slot connection between each bracket and its related horizontal deflector.

5. In a structure of the class described, the combination with a passenger transporting enclosure having a window opening, of a pair of spaced vertical air current deflectors for the opening pivotally mounted on the enclosure exteriorly of the latter, upper and lower horizontal air current deflectors for the window opening, each pivotally connected to the vertical deflectors and movable into and out of engagement with the enclosure as the vertical deflectors are moved to their operative and inoperative positions with respect to the deflection of air current against entry through the window opening, and connections between the enclosure and each horizontal deflector for guiding and controlling the movements of the latter.

6. In a structure of the class described, the combination with a passenger transporting enclosure having a window opening, of a pair of spaced vertical air current deflectors for the opening pivotally mounted on the enclosure exteriorly of the latter, upper and lower horizontal air current deflectors for the window opening, each pivotally connected to the vertical deflectors and movable into and out of engagement with the enclosure as the vertical deflectors are moved to their operative and inoperative positions with respect to the deflection of air current against entry through the window opening, and connections between the enclosure and each horizontal deflector for guiding and controlling the movements of the latter, one element of each connection constituting an operator accessible from the interior of the enclosure for directly moving the horizontal deflectors.

LEWIS O. CAMERON.